(12) United States Patent
Seo et al.

(10) Patent No.: US 8,147,069 B2
(45) Date of Patent: Apr. 3, 2012

(54) LIGHTING DEVICE AND PROJECTION IMAGE DISPLAY UNIT

(75) Inventors: Manabu Seo, Yokohama (JP); Hiroshi Akiyama, Yokohama (JP); Shigeru Oouchida, Tokyo (JP); Yukiko Hamano, Kawasaki (JP); Goichi Akanuma, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 431 days.

(21) Appl. No.: 12/509,755

(22) Filed: Jul. 27, 2009

(65) Prior Publication Data
US 2010/0033685 A1 Feb. 11, 2010

(30) Foreign Application Priority Data
Aug. 7, 2008 (JP) ................................. 2008-204661

(51) Int. Cl.
| G03B 21/26 | (2006.01) |
| G03B 21/14 | (2006.01) |
| G02B 6/34 | (2006.01) |
| G02B 27/14 | (2006.01) |
| G02B 27/12 | (2006.01) |
| G11B 7/00 | (2006.01) |

(52) U.S. Cl. .............. 353/31; 353/94; 353/20; 359/629; 359/636; 359/639; 385/37; 369/112.17; 369/112.28; 369/110.04; 369/112.16

(58) Field of Classification Search .............. 353/31, 353/94, 20; 359/629, 636, 639; 385/37; 369/112.17, 112.28, 110.04, 112.16
See application file for complete search history.

(56) References Cited

U.S. PATENT DOCUMENTS

| 5,438,453 A | 8/1995 | Kuga |
| 5,999,509 A | 12/1999 | Sugiura et al. |
| 6,084,841 A | 7/2000 | Sugiura et al. |
| 6,496,453 B2 * | 12/2002 | Asada et al. ................ 369/44.23 |
| 2006/0028816 A1 * | 2/2006 | Lee et al. ...................... 362/231 |

FOREIGN PATENT DOCUMENTS

| EP | 1 626 585 A1 | 2/2006 |
| JP | 2001-118279 | 4/2001 |
| JP | 2001-154607 | 6/2001 |
| JP | 2002-207110 | 7/2002 |
| JP | 2006-189573 | 7/2006 |
| JP | 2007-121899 | 5/2007 |
| JP | 2007-333957 | 12/2007 |
| WO | WO 01/26384 A1 | 4/2001 |

OTHER PUBLICATIONS

Nikkei Micro Devices, Nov. 2007, pp. 85-89.

* cited by examiner

*Primary Examiner* — Georgia Y Epps
*Assistant Examiner* — Magda Cruz
(74) *Attorney, Agent, or Firm* — Oblon, Spivak, McClelland, Maier & Neustadt, L.L.P.

(57) ABSTRACT

A lighting device, including a first light source emitting light of a first wavelength; a second light source close to the first source, emitting light of a second wavelength in almost a same direction as that of the first source; a third light source located emitting light of a third wavelength in a direction different from that of the first and second sources; a coupling optical system coupling light from the first and second sources; another coupling optical system coupling light from the third source; and a light path synthesizer synthesizing a light path of light from the first, second and third sources, wherein the light path synthesizer includes a first surface reflecting light from the first source and transmitting light from the second and third sources and a second surface unparallel with the first surface, reflecting light from the second source and transmitting light from the third source.

16 Claims, 15 Drawing Sheets

FIG. 4A

| LAYER | MATERIAL | THICKNESS (nm) |
|---|---|---|
| SUBSTRATE | GLASS | |
| 1 | Ta2O5 | 19 |
| 2 | SiO2 | 80 |
| 3 | Ta2O5 | 44 |
| 4 | SiO2 | 74 |
| 5 | Ta2O5 | 49 |
| 6 | SiO2 | 74 |
| 7 | Ta2O5 | 49 |
| 8 | SiO2 | 74 |
| 9 | Ta2O5 | 49 |
| 10 | SiO2 | 74 |
| 11 | Ta2O5 | 49 |
| 12 | SiO2 | 74 |
| 13 | Ta2O5 | 49 |
| 14 | SiO2 | 74 |
| 15 | Ta2O5 | 49 |
| 16 | SiO2 | 74 |
| 17 | Ta2O5 | 49 |
| 18 | SiO2 | 74 |
| 19 | Ta2O5 | 49 |
| 20 | SiO2 | 74 |
| 21 | Ta2O5 | 49 |
| 22 | SiO2 | 145 |
| SURFACE MEDIUM | AIR | |

FIRST FACE

FIG. 4B

| LAYER | MATERIAL | THICKNESS (nm) |
|---|---|---|
| SUBSTRATE | GLASS | |
| 1 | SiO2 | 74 |
| 2 | Ta2O5 | 97 |
| 3 | SiO2 | 140 |
| 4 | Ta2O5 | 84 |
| 5 | SiO2 | 122 |
| 6 | Ta2O5 | 84 |
| 7 | SiO2 | 122 |
| 8 | Ta2O5 | 84 |
| 9 | SiO2 | 122 |
| 10 | Ta2O5 | 84 |
| 11 | SiO2 | 122 |
| 12 | Ta2O5 | 84 |
| 13 | SiO2 | 122 |
| 14 | Ta2O5 | 84 |
| 15 | SiO2 | 122 |
| 16 | Ta2O5 | 84 |
| 17 | SiO2 | 122 |
| 18 | Ta2O5 | 84 |
| 19 | SiO2 | 122 |
| 20 | Ta2O5 | 84 |
| 21 | SiO2 | 412 |
| 22 | Ta2O5 | 69 |
| 23 | SiO2 | 75 |
| SURFACE MEDIUM | AIR | |

SECOND FACE

LIGHTING DEVICE AND PROJECTION IMAGE DISPLAY UNIT

BACKGROUND OF THE INVENTION

1. Field of the Invention

The present invention relates to a light device synthesizing light from plural light sources to form synthesized light and emitting the synthesized light in the same direction, and to a projection image display unit including the light device such as laser scanning projectors.

2. Discussion of the Background

Recently, projection image display units (hereinafter referred to as "projectors") using solid light sources such as LEDs and lasers are more developed, and they are expected to laptop projectors.

Japanese published unexamined applications Nos. 2006-189573 and 2001-154607 disclose small scanning projectors combined with three primary color lasers and a MEMS (Micro Electric Mechanical System) mirror, which are more developed because of being microminiaturizable.

A conventional scanning projector combined with three primary color lasers and a MEMS mirror is shown in FIG. 26. The projector in FIG. 26 includes laser diodes 1-R, 1-G and 1-B emitting laser beams of R (Red), G (Green) and B (Blue), respectively; lenses 2-R, 2-G and 2-B collecting laser beams from the laser diodes 1-R, 1-G and 1-B; dichroic mirrors 3-R, 3-G and 3-B reflecting only red light, green light and blue light, respectively and transmitting other light, respectively; a MEMS (Micro Electric Mechanical System) mirror device 501 equipped with a mirror having a variable inclined angle; and a control circuit 502 turning the mirror of the MEMS mirror device 501 in the horizontal and vertical directions and having the laser diodes 1-R, 1-G and 1-B emit intensity-modulated laser beams.

The control circuit 502 has a mirror controller and a modulator, and modulates the laser beam intensity to form an image on a screen 503.

Such color synthesizing methods need a collection lens for each laser and plural dichroic mirrors for synthesizing a light path for each laser beam, and therefore the number of parts increases, resulting in impairing downsizing and weight saving.

Japanese published unexamined applications Nos. 2007-121899 and 2007-333957 disclose methods of replacing plural dichroic mirrors with a sheet of diffraction element to synthesize a light path from the three light sources.

These methods use a sheet of diffraction element instead of plural dichroic mirrors in FIG. 26, which reduces the number of parts of the devices and downsizes the same.

International publication No. WO2005/073798 A1 discloses a configuration further locating the plural laser light sources on a mount as a package in addition to the above to reduce the number of parts of the devices, downsize the same and save weight thereof.

International publication No. WO2005/073798 A1 discloses a lighting device including three coherent light sources located on a same mount, emitting red, blue and green light; and a diffraction element diffracting the light emitted from the light sources so as to be a coaxial beam to multiplex each of the light.

Japanese published unexamined application No. 2002-207110 discloses a wedge prism synthesizing a light path of light from two light sources located on a mount, and an optical pickup device using the prism.

As mentioned above, the diffraction element can synthesize a light path of light from plural light sources with less number of parts. However, the diffraction element has the following problems.

Since the diffraction efficiency η typically varies according to wavelengths, it is not easy to prepare a diffraction element efficiently affecting plural wavelengths.

For example, a surface relief diffraction optical element is designed with a single wavelength. As shown in FIG. 27, when used for light having a wavelength different from the designed wavelength, the diffraction efficiency η lowers or a flare in imaging optics is caused thereby, resulting in deterioration of image quality.

A lighting device used for projector capable of synthesizing blue, green and red light and emitting the synthesized light is needed. They have a wavelength of from 0.4 to 0.48 μm, 0.5 to 0.55 μm and 0.6 to 0.7 μm, respectively.

Since they have large differences in wavelength, each of the blue, green and red wavelengths are difficult to have a diffraction efficiency η of nearly 100%, and it is difficult to produce only diffracted blue, green and red light having different orders each other.

Therefore, when such a diffraction element is used for a lighting device, the light use efficiency lowers and unnecessary light having no synthesized light path is produced, resulting in flare.

Alternatively, as disclosed in international publication No. WO2005/073798 A1, a volume hologram is thought to diffract only a desired wavelength. However, since the volume hologram has a very narrow scope of allowable wavelength having high diffraction efficiency, the diffraction efficiency lowers when the light sources have accidental wavelength errors, resulting in deterioration of light use efficiency and production of unnecessary flare light.

Particularly, a laser diode light source largely varies in wavelength according to the solid and the environmental variation such as temperature variation.

Thus, it is practically difficult to use the diffraction element for synthesizing a light path because of deterioration of light use efficiency and production of flare.

The wedge prism disclosed in Japanese published unexamined application No. 2002-207110 can synthesize a light path of light from two light sources located on a mount. A lighting device usable for laser scanning projector needs efficiently synthesizing light having different wavelengths from three (red, green and blue) light sources to form synthesized light and emitting the synthesized light to a pickup device.

Red and blue laser diodes are available, but a chip-shaped small light source such as a laser diode is not available as a green light source. Therefore, a green light source is difficult to locate close to other light sources and needs another configuration when used for a pickup device as a lighting device.

Because of these reasons, a need exists for a lighting device efficiently synthesizing light from three light sources and emitting the synthesized light, which is downsizable and improving light use efficiency.

SUMMARY OF THE INVENTION

Accordingly, an object of the present invention is to provide a lighting device efficiently synthesizing light from three light sources and emitting the synthesized light, which is downsizable and improving light use efficiency.

Another object of the present invention is to provide a projection image display unit using the lighting device.

These objects and other objects of the present invention, either individually or collectively, have been satisfied by the discovery of a lighting device, comprising:

a first light source configured to emit light having a first wavelength;

a second light source located close to the first light source and configured to emit light having a second wavelength in almost a same direction as that of the first light source;

a third light source configured to emit light having a third wavelength and located so as to emit the light in a direction different from that of the first and second light sources;

a first coupling optical system configured to couple light from the first and second light sources;

a second coupling optical system configured to couple light from the third light source; and a light path synthesizing element configured to synthesize a light path of light from the first, second and third light sources, wherein the light path synthesizing element comprises a first surface and a second surface unparallel with the first surface, and wherein the first surface reflects light from the first light source and transmits light from the second and third light source, and the second surface reflects light from the second light source and transmits light from the third light source.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIGS. 4A and 4B are data showing film configuration of surfaces of the light path synthesizing element;

DETAILED DESCRIPTION OF THE INVENTION

Figure 1:
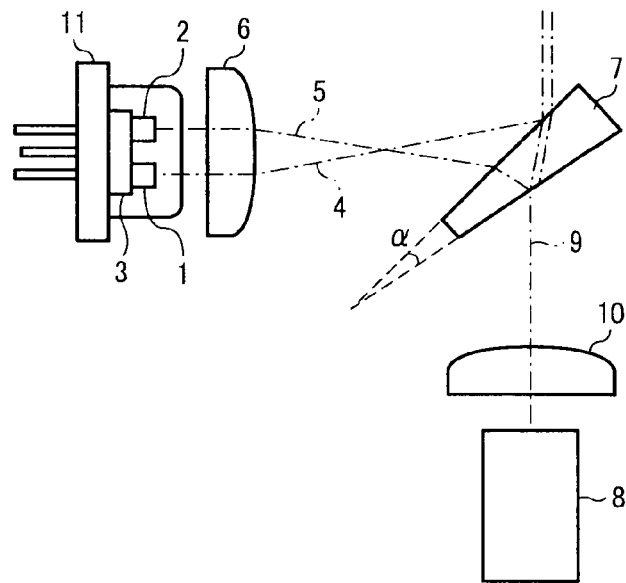
FIG. 1 is a schematic plane view illustrating a first embodiment of the lighting device of the present invention.

The present invention provides a lighting device efficiently synthesizing light from three light sources and emitting the synthesized light, which is downsizable and improving light use efficiency. Particularly, the present invention relates to a lighting device, comprising:

a first light source configured to emit light having a first wavelength;

a second light source located close to the first light source and configured to emit light having a second wavelength in almost a same direction as that of the first light source;

a third light source configured to emit light having a third wavelength and located so as to emit the light in a direction different from that of the first and second light sources;

a first coupling optical system configured to couple light from the first and second light sources;

a second coupling optical system configured to couple light from the third light source; and a light path synthesizing element configured to synthesize a light path of light from the first, second and third light sources, wherein the light path synthesizing element comprises a first surface and a second surface unparallel with the first surface, and wherein the first surface reflects light from the first light source and transmits light from the second and third light source, and the second surface reflects light from the second light source and transmits light from the third light source.

First, a first embodiment of the lighting device of the present invention will be explained, based on FIGS. 1 to 11.

The light device has a first light source 1 emitting light having a first wavelength λ1 and a second light source 2 emitting light having a first wavelength λ2 mounted on a same mount 3 adjacent to each other in one package 11. The first light source 1 and the second light source 2 emit light in almost a same direction.

A laser diode emitting light having a blue wavelength range (hereinafter referred to as a "blue LD") and a laser diode emitting light having a red wavelength range (hereinafter referred to as a "red LD") can be used as the first and second light sources, respectively.

The blue wavelength range and red wavelength range have a wavelength of from 400 to 480 nm and 600 to 700 nm, respectively. A LD emitting light having a wavelength λ1 of 445 nm and a LD emitting light having a wavelength λ2 of 630 nm can be used as the blue LD and red LD, respectively. These wavelengths are used in the following explanation. A blue LD1 and a red LD2 are mounted on the same mount 3 in separate chips, but may be formed on one chip.

Blue light 4 from the blue LD1 and red light from the red LD2 are coupled by a same first coupling optical system 6 (hereinafter referred to as a "first CL") and introduced to a light path synthesizing element 7.

Light paths of each color light are schematically shown in FIG. 1. In the lighting device of the present invention, a third light source 8 emitting light having a third wavelength λ3 is located at a position from the package 11.

Specifically, the third light source 8 is located so as to emit light in a direction different from that of the first and second light sources (almost perpendicular thereto).

A green light source emitting light having a wavelength of from 500 to 550 nm can be used as the third light source 8. A laser diode is most preferably used as the green light source, but a stably-usable green laser diode is not available at present. Therefore, a solid laser and a double wavelength of an infrared laser diode are used in many cases. A specific configuration of the green light source will be mentioned later, and a light source emitting light having a wavelength of 532 nm is used in this embodiment.

In the optical pickup device disclosed in Japanese published unexamined application No. 2002-207110, the light sources are typically located in the wavelength order (blue<green<red). In this embodiment, the third light source 8 emitting light having a green wavelength range is not entered into the same surface of the light path synthesizing element 7 as a same package with the first and second light sources, and entered in a surface different therefrom (a second surface mentioned later). Namely, when the green light source not having the shape of a chip such as a laser diode is combined in the same package of the first and second light sources, the compactness of the package of the first and second light sources is impaired.

Figure 26:
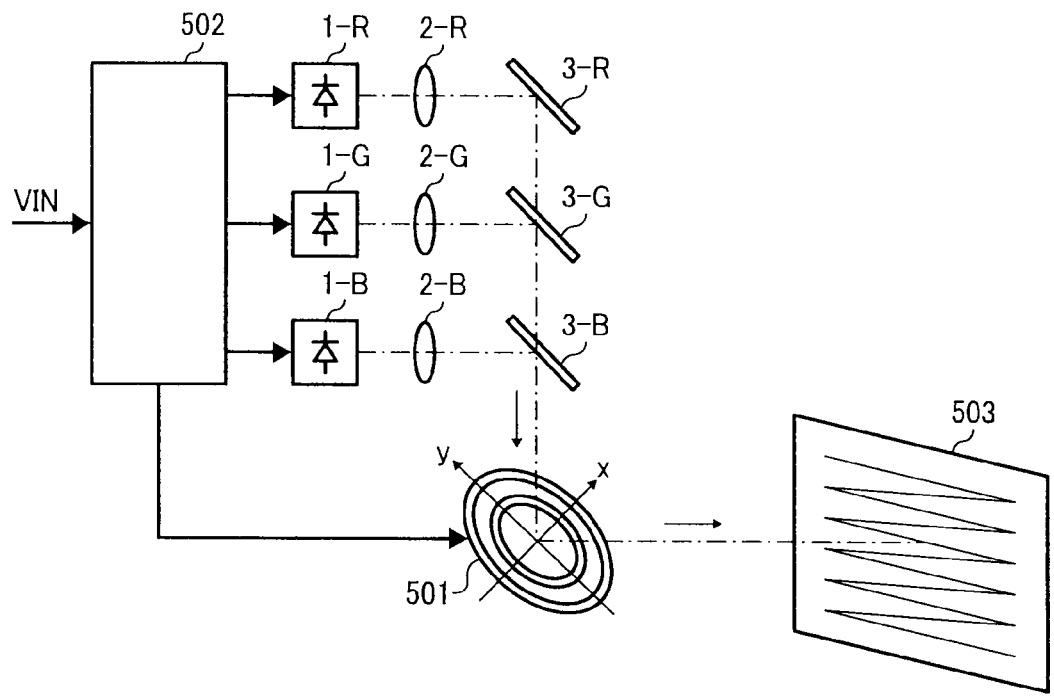
FIG. 26 is a schematic view illustrating a conventional scanning projector.
Figure 27:
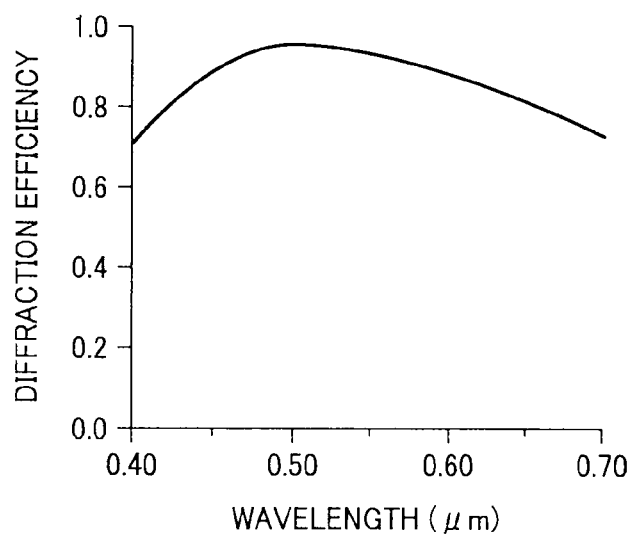
FIG. 27 is a diagram showing a relationship between a wavelength and a diffraction efficiency.

In this embodiment, the lighting device which needs efficiently synthesizing light from the three light sources compacts the conventional method in FIG. 26 while maintaining the compactness of the package of the first and second light sources. The compactness (of capacity) of the lighting device largely influences the compactness of a laser scanning projector. A practical priority of the compactness of the conventional method is mentioned later.

Green light 9 from a green light source 8 is coupled by a second coupling optical system 10 (hereinafter referred to as a "second CL") and introduced to the light path synthesizing element 7. Red light 4, blue light 5 and the green light 9 entered into the light path synthesizing element 7 are synthesized in a same light path and emitted.

Thus, a lighting device emitting light having three red, blue and green wavelength ranges in a same light path is formed.

In the above explanation, the first light source having a blue wavelength range, the second light source having a red wavelength range and the third light source having a green wavelength range are used, but may have different wavelength ranges or different combinations. The light source synthesizing three red, blue and green light and emitting the synthesized light is most useful because it can be used as a light source for a scanning projector.

In addition, as mentioned above, a laser diode emitting green light is not available and the green light source is difficult to locate in a same mount of the other light sources. Therefore, a configuration where the first light source is red or blue, the second light source is blue or red and the third light source is green is easy to prepare.

The first and second coupling optical systems are planeconvex lenses in FIG. 1, and may have other shapes or plural optical elements. Particularly, the first coupling optical system is preferably formed of plural lenses to reduce chroma aberration to the red and blur light. Alternatively, it may have a diffraction structure in addition to conventional refractive lenses.

Figure 2:
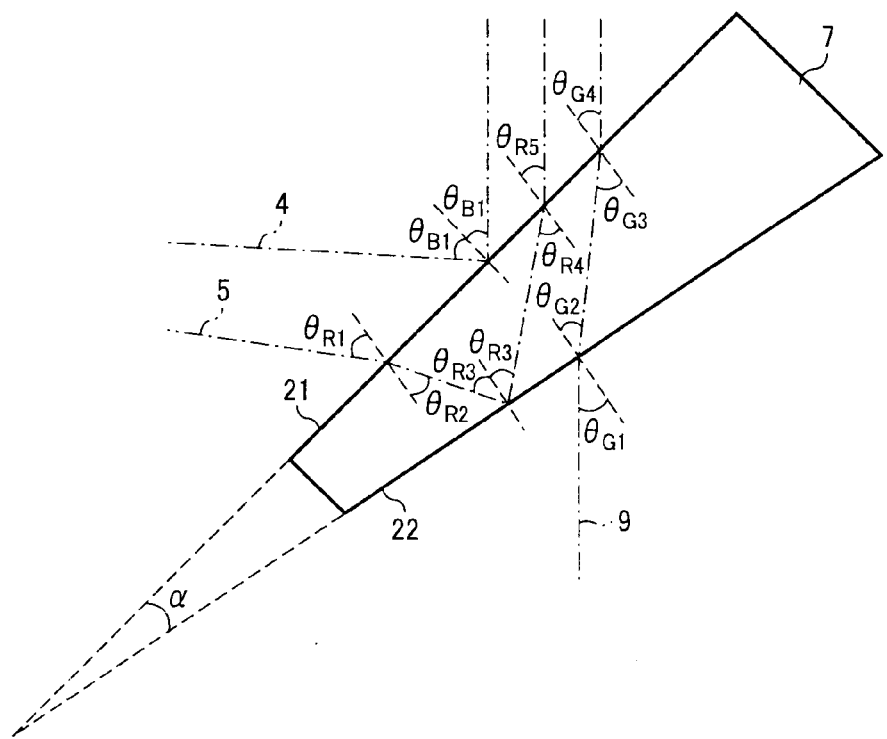
FIG. 2 is a schematic view for explaining the function of a light path synthesizing element.

The function of a light path synthesizing element is explained in detail, referring to FIG. 2. The light path synthesizing element 7 is a wedge-shaped flat plate formed of a first surface 21 reflecting light having a blue wavelength range and transmitting light having a red wavelength range and a green wavelength range, and a second surface reflecting light having a red wavelength range and transmitting light having a green wavelength range. The first and second surfaces are relatively inclined at an angle of α.

The light path synthesizing element 7 is located such that the peak of the wedge points to the light source. "Points to the light source" does not mean "surfaces the light source" but means "approaching the light source".

The blue light 4 and red light 5 enter the first surface, and reflected by the first and second surfaces, respectively, and emitted. The green light 9 enters the second surface, transmits the second and first surfaces, and emitted. The first and second surfaces are selectively reflecting or transmitting light according to the wavelength. Such a surface is formed of an optical multiple layer and called a dichroic mirror.

Figure 3:
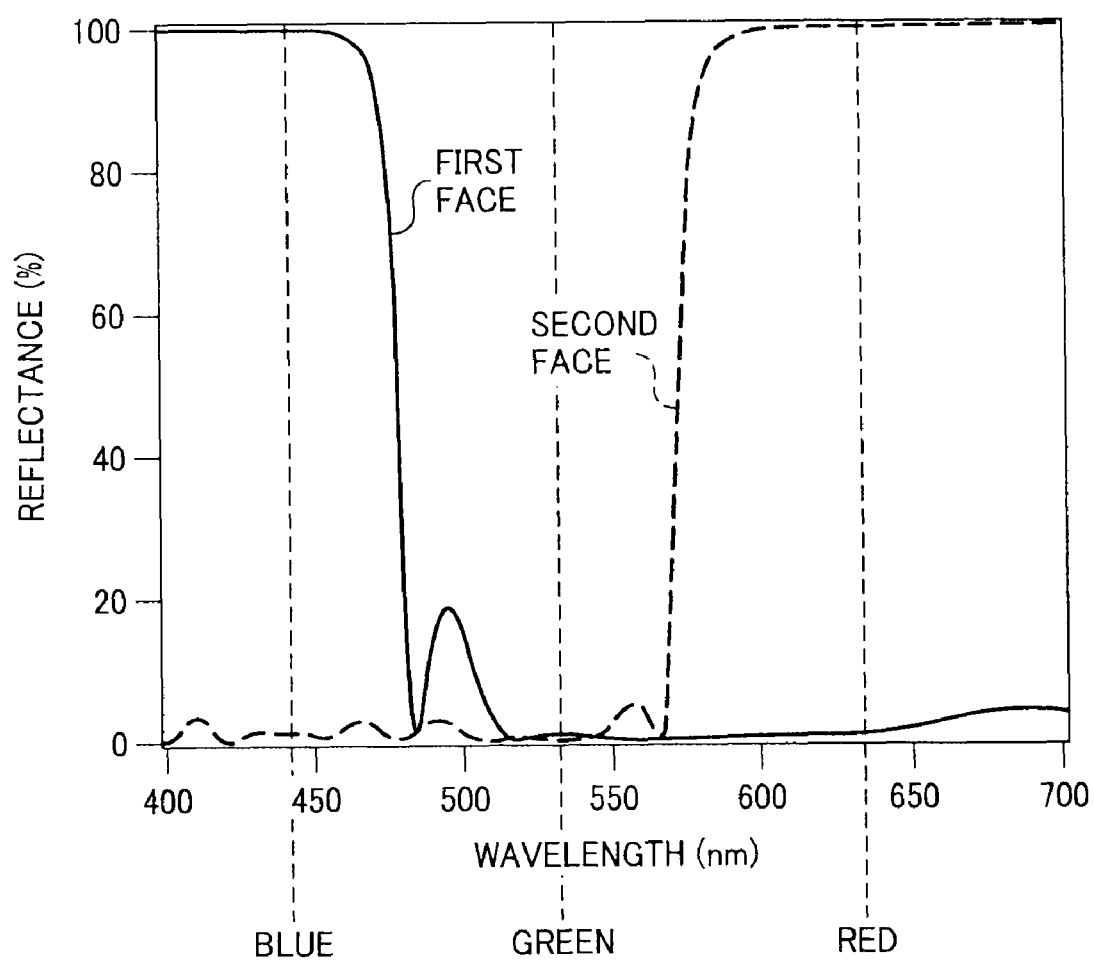
FIG. 3 is a diagram showing a spectral refractive index by color.

FIG. 3 is a spectral refractive index of a polarization component s entered into the first and second surfaces at an incident angle of 45°. The first surface is drawn with a full line and the second surface with a dotted line therein. The first surface has a high refractive index to the blue light having a wavelength λ1 (445 nm), and a dichroic mirror having a low refractive index to the red light having a wavelength λ2 (630 nm) and the green light having a wavelength λ3 (532 nm). The second surface has a high refractive index to the red light having a wavelength λ2 (630 nm) and a dichroic mirror having a low refractive index to the green light having a wavelength λ3 (532 nm).

Specific layer structures of the first surface are shown in FIG. 4A and those of the second surface are in FIG. 4B. A low-refractive index material silicon dioxide ($SiO_2$) and a high-refractive index material tantalum pentoxide ($Ta_2O_5$) are used, besides, materials such as magnesium fluoride titanium oxide which are typically used in an optical multiple layer can be used. The substrate there in means a wedge-shaped flat plate.

The dichroic mirror can make the refractive index close to 100% in a desired wavelength range and a transmission close to 100% in a different wavelength range, and has better light use efficiency than a method of using a diffraction element as a light path synthesizing element.

A difference between luminous points of the blue LD1 and red LD2 does not conform a light path of the blue light 4 and red light 5 coupled by the first CL6. For example, the luminous points of the blue LD1 and red LD2 have a gap of 110 μm, and when the first CL6 has a focal distance f of 2.1 mm, the blue light and red light emitted from the first CL6 have aberrational light axes at an angle about 3°.

The light path synthesizing element 7 can correct the angle disagreement because the second surface is inclined with respect to the first surface at an angle of α. This will be explained with formulae.

[1. Blue Light]

When the blue light enters the light path synthesizing element 7 at an incident angle of $\theta_{B1}$, the blue light has an output angle of $\theta_{B1}$ to a normal line of a first surface 21 of the light path synthesizing element 7.

[2. Red Light]

When a material forming the light path synthesizing element 7 has a refractive index $n_R$ to red light, $\theta_{R1}$, $\theta_{R2}$, $\theta_{R3}$, $\theta_{R4}$ and $\theta_{R5}$ in FIG. 2 satisfy the following relationships:

$$\sin \theta_{R2} = 1/n_R \cdot \sin \theta_{R1} \quad (1)$$

$$\theta_{R3} = \theta_{R2} + \alpha \quad (2)$$

$$\theta_{R4} = \theta_{R3} + \alpha \quad (3)$$

$$\sin \theta_{R5} = n_R \cdot \sin \theta_{R4} \quad (4)$$

Since the red light has an output angle of $\theta_{R5}$ to a normal line of the first surface 21 of the light path synthesizing element, the light axes of the red and blue light are preferably emitted in parallel when $\theta_{R5}$ and $\theta_{B1}$ are the same. Therefore, the best embodiment of the present invention is that a light path synthesizing element has the first and second surfaces at angle of α such that $\theta_{R5}$ is equal to $\theta_{B1}$.

For example, when the light path synthesizing element has a refractive index of 1.5 and $\theta_{B1}$ is 45°, α is about 0.82°.

[3. Green Light]

When a material forming the light path synthesizing element 7 has a refractive index $n_G$ to red light, $\theta_{G1}$, $\theta_{G2}$, $\theta_{G3}$, and $\theta_{G4}$ in FIG. 2 satisfy the following relationships:

$$\sin \theta_{G2} = 1/n_G \cdot \sin \theta_{G1} \quad (5)$$

$$\theta_{G3} = \theta_{G2} + \alpha \quad (6)$$

$$\sin \theta_{G4} = n_G \cdot \sin \theta_{G3} \quad (7)$$

Since the green light has an output angle of $\theta_{G4}$ to a normal line of the first surface 21 of the light path synthesizing element 7, the light axes of the green, red and blue light are preferably emitted in parallel when $\theta_{g4}$, $\theta_{B1}$ and $\theta_{R5}$ are the same. Therefore, in this embodiment of the present invention, a green light source is located such that green light enters the second surface of the light path synthesizing element at an incident angle of $\theta_{G1}$ satisfying $\theta_{G4} = \theta_{B1} = \theta_{R5}$.

For example, when the light path synthesizing element has a refractive index of 1.5, $\theta_{B1}$ is 45° and a is about 0.82°, the green light source is located such that the incident angle $\theta_{G1}$ is 43.5°.

Further, in a lighting device emitting red, blue and green light in the same light path, a position between a first CL and a light path synthesizing element and a position between a green laser and the light path synthesizing element are preferably located such that central light axes of each colored light emitted from a first surface of the light path synthesizing element are conformed.

Hereinafter, an embodiment in which the central light axes of the emitted blue light 4 and red light 5 are almost conformed is explained.

Figure 5:
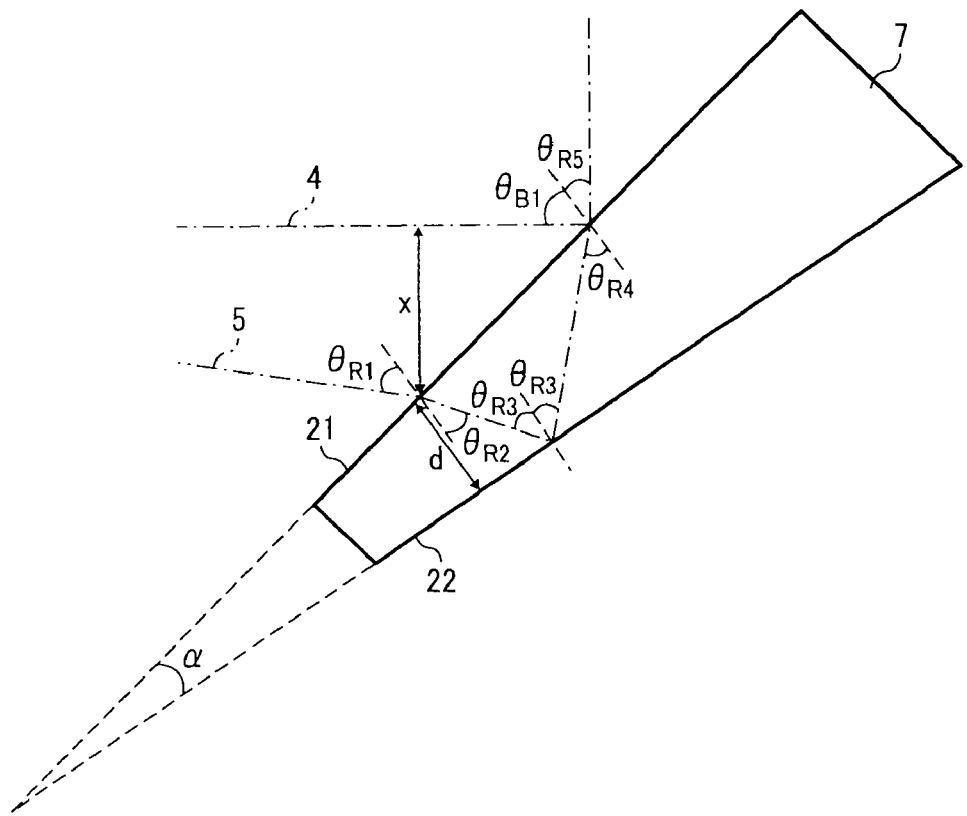
FIG. 5 is a schematic view for explaining a configuration where central light axes of the blue and red emitting light are almost identical in the light path synthesizing element.

In FIG. 5, an incident light axis has a position displacement x to conform the central light axes when emitted and the light path synthesizing element 7 has a thickness d at a position where the red light enters. When an angle α between the first and second surfaces of the light path synthesizing element is small, and the red light 5 and blue light 4 enter the light path synthesizing element 7 at almost a same angle, the red light 5 has a position displacement x having the following formula at a position where the red light 5 enters the light path synthesizing element 7.

$$x = 2d \tan \theta_{R3} \cdot \cos \theta_B \quad (8)$$

For example, when the light path synthesizing element 7 has a refractive index of 1.5, α is 0.82°, d is 0.5 mm and $\theta_{B1}$ is 45°, the position displacement x is 0.365 mm.

The locations of the blue LD1, red LD2, first CL6 and the light path synthesizing element 7 will be explained, using FIG. 6. When the blue LD1 and red LD2 have a gap a therebetween and the first CL6 has a focal distance f, the first CL6 and the light path synthesizing element 7 have a gap L therebetween having the following formula and satisfying the incident light position displacement x when entering the light path synthesizing element 7.

$$L = f + f \cdot x/a \quad (9)$$

When the gap a between the blue LD1 and red LD2 is too small, the heat release efficiency deteriorates. When too large, the first CL deteriorates in coupling efficiency or produces an aberration in coupling. Therefore, they need a suitable gap therebetween.

For example, when the gap a is 0.1 mm and the focal distance is 2 mm, the gap L between the first CL6 and the light path synthesizing element 7 is 9.3 mm.

Thus, the central light axes of the emitted blue light 4 and red light 5 are almost conformed.

Thus, the light path synthesizing element synthesizes the light paths of the blue, red and green light.

The above-mentioned light path synthesizing element is a dichroic mirror formed of an optical multiple layer including a first surface and a second surface. Either of them may be a polarization separation surface. The polarization separation surface divides a polarization component s and a polarization component p into reflection and transmission to the entrance surface, respectively. The polarization separation surface can be formed with an optical multiple layer or a wire grid element having a fine lattice structure. For example, in FIG. 2, the red and green light having different polarized light take the light path in FIG. 2 even when the second surface is a polarization separation surface.

Figure 7:
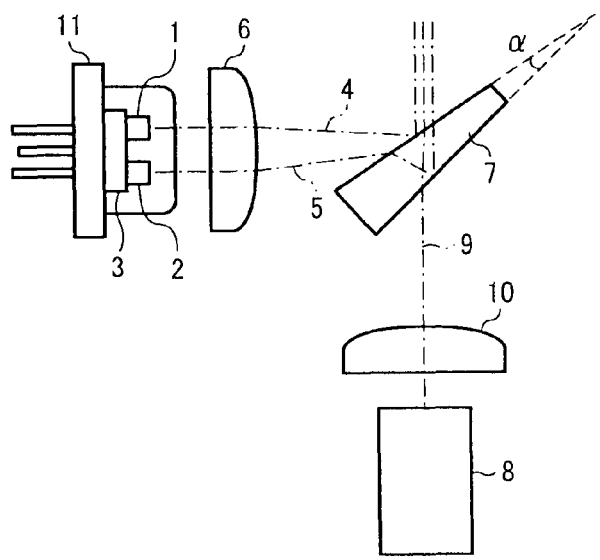
FIG. 7 is a schematic plane view of a lighting device where the light path synthesizing element is located such that a peak side thereof looks towards a direction away from a light source.

As shown in FIG. 7, a wedge-shaped flat plate having a inclination reverse to that in FIG. 1 can be used as the light path synthesizing element 7. Namely, in the formulae (1) to (7), a is a negative value. Then, the light path can be synthesized as FIG. 2 is explained.

For example, when the light path synthesizing element 7 has a refractive index of 1.5, $\theta_{B1}$ is 45° and α is 0.79°, the green light source is located so as to have an incident angle $\theta_{G1}$ of 46.5°.

Figure 6:
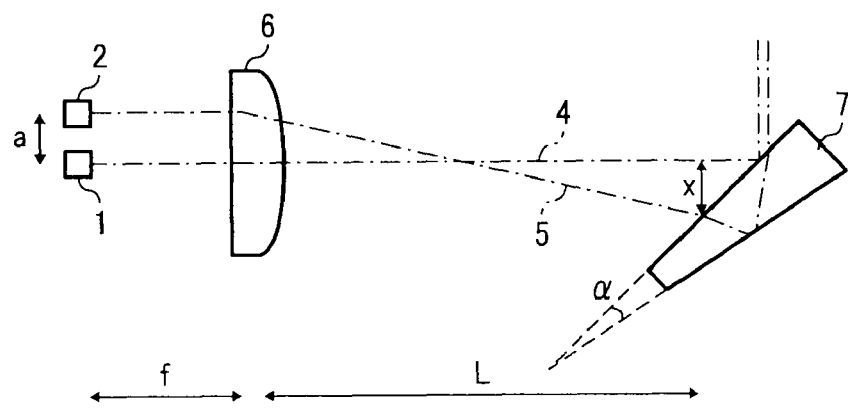
FIG. 6 is a schematic view for explaining conditions of almost identifying central light axes of the blue and red emitting light in a configuration where the light path synthesizing element is located such that a peak side thereof looks towards a light source.

In FIG. 7, the central axes of the emitted blue light 4 and red light 5 can almost be conformed as they are in FIGS. 5 and 6. This will be explained, using FIG. 8. Similarly to FIG. 6, the blue LD1 and red LD2 have a gap a therebetween, the first CL6 has a focal distance f, the first CL6 and the light path synthesizing element 7 have a gap L therebetween.

Similarly to FIG. 5, when an angle α between the first and second surfaces of the light path synthesizing element is small, and the red light 5 and blue light 4 enter the light path synthesizing element 7 at almost a same angle, the red light 5 has a position displacement x having the formula (8) at a position where the red light 5 enters the light path synthesizing element 7.

For example, when the light path synthesizing element 7 has a refractive index of 1.5, α is 0.79°, d is 0.5 mm and $\theta_{B1}$ is 45°, the position displacement x is 0.39 mm.

The first CL6 and the light path synthesizing element 7 have a gap L therebetween having the following formula (10) and satisfying the incident light position displacement x determined by the formula (8).

$$L=f-f\times x/a \quad (10)$$

For example, when the gap a is 0.5 mm and the focal distance is 10 mm, the gap L between the first CL6 and the light path synthesizing element 7 is 2.2 mm.

Thus, the central light axes of the emitted blue light 4 and red light 5 are almost conformed.

Figure 8:
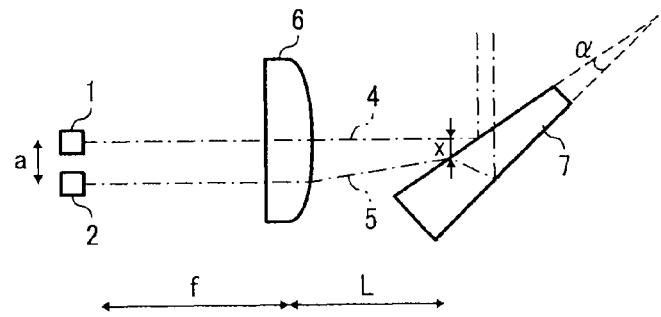
FIG. 8 s a schematic view for explaining conditions of almost identifying central light axes of the blue and red emitting light in a configuration where the light path synthesizing element is located such that a peak side thereof looks towards a direction away from a light source.

In FIG. 8, the blue LD1 and red LD2 cannot have a small gap a as the formula (10) shows. When the focal distance f is small, L is very small, resulting in difficulty of locating the light path synthesizing element 7 and the first CL6.

A first CL having a short focal distance f is preferably used to downsize the light source and heighten the light use efficiency. In this respect, the configuration in FIG. 6 is more preferably used than that in FIG. 8 because the location is easy even with a first CL having a short focal distance f.

[Astigmatism]

In FIG. 1, when the red light 5 entering the light path synthesizing element 7 is convergent light or diverging light, an astigmatism is produced when the red light 5 transmits the wedge-shaped flat plate. In addition, an astigmatism is produced when the red light is located out of the light axis of the first CL.

Figure 9:
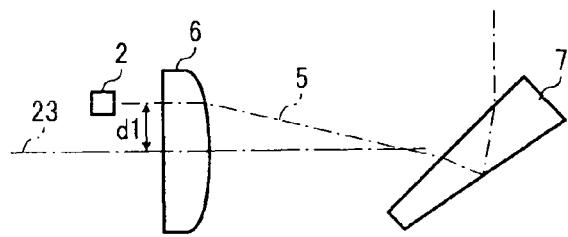
FIG. 9 is a schematic view showing a positional relationship between the second light source and the first coupling lens to reduce astigmatism.

The lighting device of the present invention preferably has a luminous point at a position with a distance d1 from the central light axis of the first collimated optical system (CL) in a direction to reduce the astigmatism caused by the second light source transmitting the wedge-shaped flat plate. An embodiment thereof is shown in FIG. 9. When the first CL6 is a flat convex lens, the light path synthesizing element 7 is a wedge-shaped flat plate in FIG. 2 and the red light 5 entering the light path synthesizing element 7 is diverging light, the red LD is located so as to have a luminous point above in the drawing relative to a light axis 23 of the first CL6.

Further, in FIG. 1, when the green light 9 entering the light path synthesizing element 7 is convergent light or diverging light, an astigmatism is produced when the green light 9 transmits the wedge-shaped flat plate as when the red light does. Therefore, as the above-mentioned red light, the luminous point is preferably located at a position with a distance d2 from the central light axis of the second collimated optical system (CL) in a direction to reduce the astigmatism caused by the green light transmitting the wedge-shaped flat plate.

Figure 10:
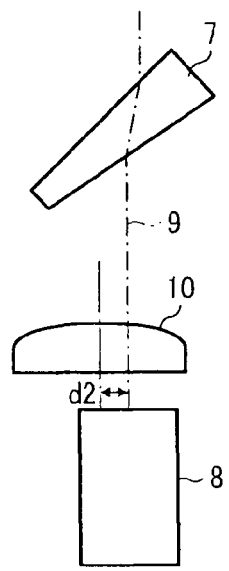
FIG. 10 is a schematic view showing a positional relationship between the third light source and the second coupling lens to reduce astigmatism.

An embodiment thereof is shown in FIG. 10. When a second CL10 is a flat convex lens, a light path synthesizing element 7 is a wedge-shaped flat plate in FIG. 2 and the green light 9 entering the light path synthesizing element 7 is diverging light, the red LD is located so as to have a luminous point left in the drawing relative to a light axis 24 of the second CL10.

The laser diode typically produces an oval beam, and the shape of an oval possibly deteriorates the performance of a lighting device, depending on the constitution and the application. Therefore, a beam shaping optical system is typically needed to encircle the oval beam.

The lighting device of the present invention, using a laser diode emitting an oval beam as a second light source can improve the shape of a beam without a shaping optical system. This will be explained using FIG. 11.

Figure 11:
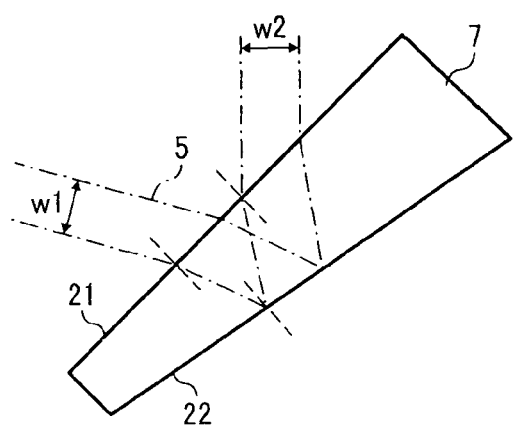
FIG. 11 is a schematic view for explaining conditions of the shape of a beam in the light path synthesizing element.

In FIG. 11, the red light 5 having a beam diameter $W_1$ enters the light path synthesizing element 7 in a direction parallel to a paper surface. When emitted from the light path synthesizing element 7, the beam diameter $W_1$ parallel to the paper surface changes to $W_2$. The beam diameter ratio $W_2/W_1$ is determined by the following formula (11).

$$W_2/W_1=\cos(\theta_{R2})/\cos(\theta_{R1})\times\cos(\theta_{R5})/\cos(\theta_{R4}) \quad (11)$$

wherein $\theta_{R2}$, $\theta_{R1}$, $\theta_{R5}$ and $\theta_{R4}$ are the same in FIG. 2, and satisfy the formulae (1), (2), (3) and (4). On the other hand, a beam diameter vertical to the paper surface does not change when passing the light path synthesizing element 7. Therefore, the light path synthesizing element 7 formed of a wedge-shaped flat plate can shape a beam. In the light path synthesizing element in which $W_2/W_1>1$, the red light source is located such that the oval red light 4 has a short axis parallel to the paper surface. In the light path synthesizing element in which $W_2/W_1<1$, the red light source is located such that the oval red light 4 has a long axis parallel to the paper surface. For example, $W_2/W_1$ is 0.97 when $\theta_{R5}$ is 45°, α is 0.82° and n is 1.5, and therefore the red light source is located such that the oval red light has a long axis parallel to the paper surface.

A second embodiment will be explained, based on FIG. 12 or 14. The same parts have the same numbers, and only main parts will be explained, omitting explanations already made on the configurations and functions unless particularly necessary (this is same for following other embodiments).

The light path synthesizing element may be formed with two or more optical elements. An embodiment formed of two prisms is shown in FIG. 12 as a light path synthesizing element 40. In FIG. 12, a first prism 41 and a second prism 42 are bonded to each other through an adhesion layer 43. An adherend of the first prism is a first surface 44 and an adherend of the second prism is a second surface 45, and the first surface 44 and the second surface 45 are bonded to each other at a predetermined angle α on a decline.

In the lighting device in FIG. 1, it is difficult to precisely adjust a gap between the blue LD1 and the red LD2, and a positional adjustment error is possibly made. When a wedge-shaped flat plate is used as the light path synthesizing element 7 as shown in FIG. 1, since the first and second surfaces are fixed, the positional adjustment error becomes a light path error after synthesized.

Figure 12:
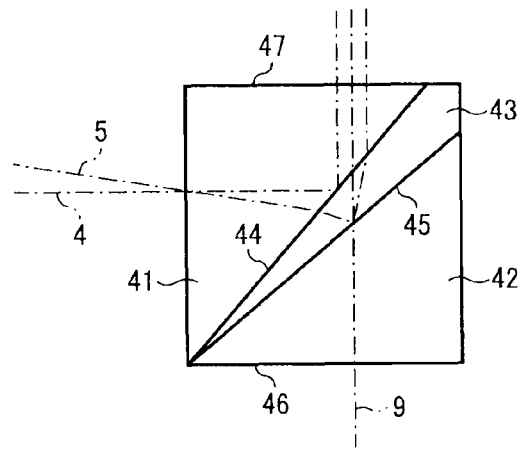
FIG. 12 is a schematic view illustrating a light path synthesizing element in a second embodiment of the lighting device of the present invention.

Meanwhile, when the two prisms shown in FIG. 12 are used, the first and second surfaces have separate optical elements and can be adjusted when assembled. Therefore, even when there is a positional error on the locations of the red LD and blue LD, the light path error can be reduced when the light path synthesizing element is assembled.

Figure 13:
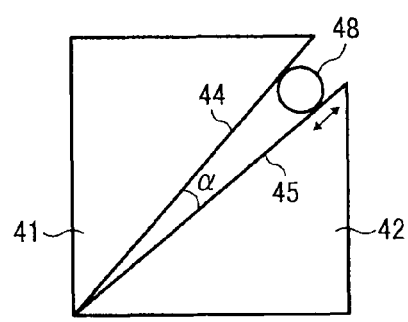
FIG. 13 is a schematic view illustrating a light path synthesizing element having an angle adjustment mechanism.

As shown in FIG. 13, an angle adjuster for adjusting a relative angle of the first surface and second surfaces is preferably present between the two prisms. In FIG. 13, a spacer 48 is located between the first prism 41 and the second prism 42, and which is moved in a direction indicated by an arrow to adjust the relative angle of the first surface 44 and second surface 45.

In addition, according to a relative positional relation among the first light source, the second light source and the first CL, the location of a spacer 50 is adjusted and fixed with an adhesive to fix the relative angle of the first and second surfaces.

In the light path synthesizing element in FIG. 12, a first entrance surface 46 light from the third light source enters and an output surface 47 the green light 9 from the third light source emits from are preferably located in parallel.

The first entrance surface 46 and the output surface 47 located in parallel can minimize astigmatism produced when the green light 9 transmits the light path synthesizing element 40.

In FIG. 12, a second entrance surface (the second surface 45) is more preferably located such that either of the red or the blue light has a minimum astigmatism produced when passing the light path synthesizing element 40.

Figure 14:
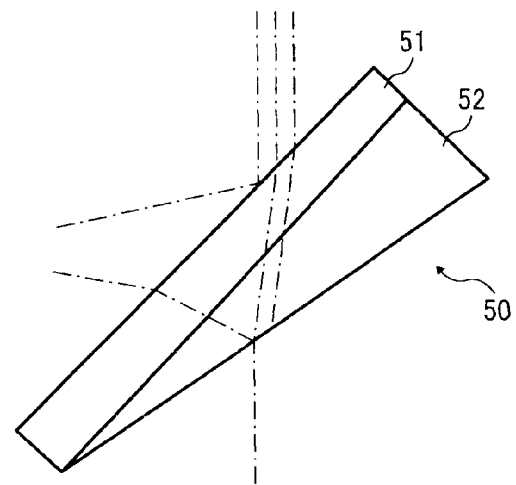
FIG. 14 is a schematic view illustrating another light path synthesizing element in the second embodiment.

Further, another embodiment of the light path synthesizing element formed of two or more optical elements is shown in FIG. 14. A light path synthesizing element 50 is formed of laminated first and second wedge-shaped flat plates 51 and 52.

The first and second wedge-shaped flat plates 51 and 52 are formed of materials having different refractive index and refractive index wavelength dispersion from each other.

The Laser diode typically varies its wavelength due to an environment such as a temperature, and the lighting device in FIG. 1 possibly shifts the light path due to the refractive index wavelength dispersion of a material forming the light path synthesizing element when the red LD varies its oscillation wavelength.

The light path synthesizing element formed of plural materials having different refractive index wavelength dispersion from each other as shown in FIG. 14 can reduce the shift of the light path when the red LD varies its oscillation wavelength.

A third embodiment will be explained, based on FIG. 15 or 17.

A first light source 1 emitting light having a first wavelength λ1, a second light source 2 emitting light having a first wavelength λ2 and a third light source 60 emitting light having a first wavelength λ3 are mounted on a same mount 61 as one package 62.

Figure 16:
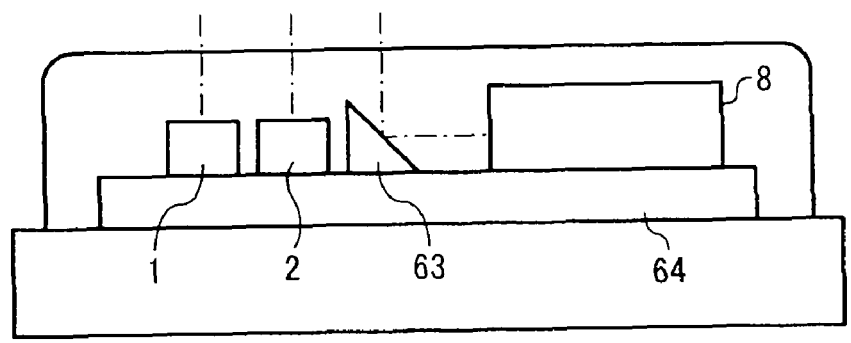
FIG. 16 is a schematic view illustrating a mounting configuration of a light source.

As mentioned in the explanation of FIG. 1, a blue LD having a wavelength of 445 nm, a red LD having a wavelength of 630 nm and a green light source having a wavelength of 532 nm can be used as the first, second and third light sources, respectively. A green LD is most preferably used as a green light source (the third light source 60). However, since a green LD is not available at present, as shown in FIG. 16, a green light source 8 formed with a start-up mirror 63 and on a same mount 64 where the blue LD1 and red LD2 are formed on may be used.

The blue light 4 from the blue LD1, the red light 5 from the red LD2 and the green light 65 from the green light source 60 (equivalent to the light green light 9 in FIG. 1) are coupled by a same coupling lens (CL) 66 and introduced to a light path synthesizing element 67.

The blue light 4, red light 5 and green light 65 coupled by the CL 66 shift their light axes due to displacements of their light sources. For example, the luminous points of the blue LD1 and the red LD2 have a shift length of 110 μm, and the luminous points of the red LD2 and the green light source 60 further have a shift length of 110 μm. When the CL has a focal distance f of 2.1 mm, the blue light 4 and red light 5 shift their light axes at an angle of 3°, and the red light 5 and green light 65 further shift their light axes at an angle of 3°.

Light paths of color light having shifted light axes are synthesized by the light path synthesizing element 67. This is explained, using FIG. 17.

The light path synthesizing element 67 is formed of a first wedge-shaped flat plate 68 and a second wedge-shaped flat plate 69. The light path synthesizing element has a first surface 71 reflecting light having a blue region, and transmitting light having a red region and light having a green region; a second surface 72 reflecting light having a red region and transmitting light having a green region; and a third surface 73 reflecting light having a green region. The first surface 71 and the second surface 72 form the first wedge-shaped flat plate 68 relatively inclined at an angle of α. The second surface 72 and the third surface 73 form the second wedge-shaped flat plate 69 inclined at an angle of β.

Dichroic mirrors can be used for the first and second surfaces as mentioned in the explanation of FIG. 2. A reflection surface simply formed of a metal, etc. can be used as the third surface.

The light path of each color light is explained.

[1. Blue Light]

When the blue light enters the light path synthesizing element 67 at an incident angle of $\theta_{B1}$, the blue light has an output angle of $\theta_{B1}$ to a normal line of the first surface 71 of the light path synthesizing element.

[2. Red Light]

When the first wedge-shaped prism 68 has a refractive index n, the light path of the red light can be shown by the formulae (1), (2), (3) and (4). The red light has an output angle of $\theta_{R4}$ relative to a normal line of the first surface 71 of the light path synthesizing element.

[3. Green Light]

Figure 17:
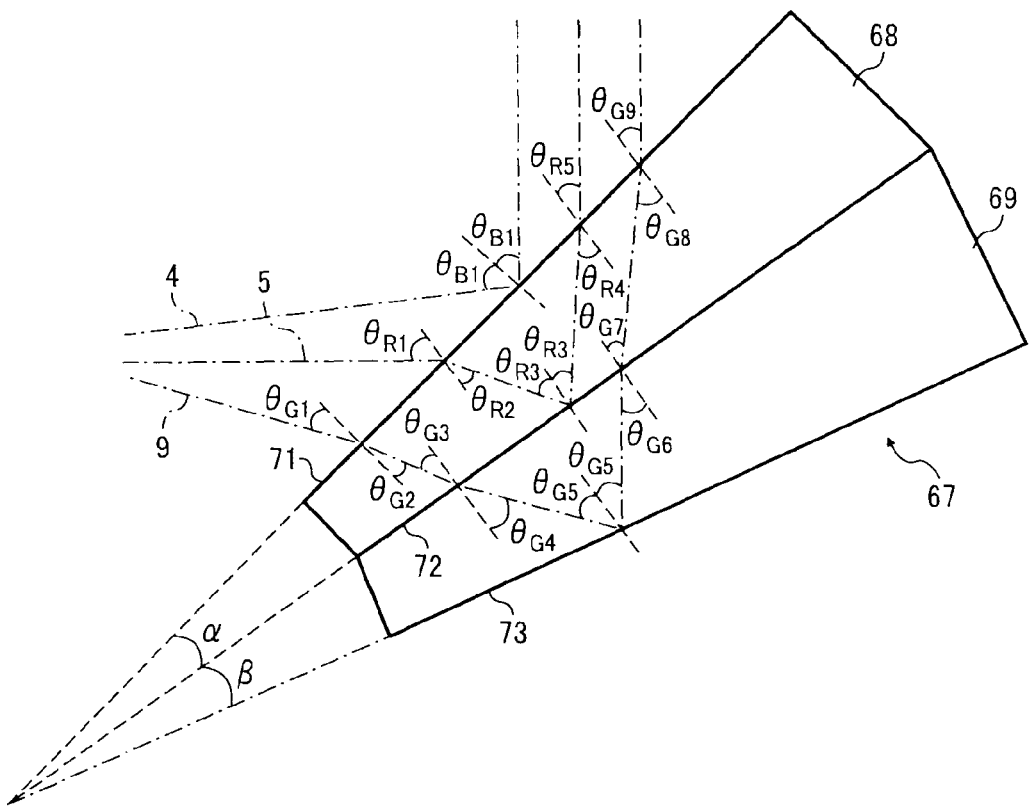
FIG. 17 is a schematic view illustrating a light path synthesizing function of the light path synthesizing element.

When the second wedge-shaped prism 69 has a refractive index $n'_G$, $\theta_{G1}$, $\theta_{G2}$, $\theta_{G3}$, $\theta_{G4}$, $\theta_{G5}$, $\theta_{G6}$, $\theta_{G7}$, $\theta_{G8}$ and $\theta_{G9}$ in FIG. 17 satisfy the following relationships:

$$\sin\theta_{G2} = 1/n_G \cdot \sin\theta_{G1} \tag{12}$$

$$\theta_{G3} = \theta_{G2} + \alpha \tag{13}$$

$$\sin\theta_{G4} = n_G/n'_G \cdot \sin\theta_{G3} \tag{14}$$

$$\theta_{G5} = \theta_{G4} + \beta \tag{15}$$

$$\theta_{G6} = \theta_{G5} + \beta \tag{16}$$

$$\sin\theta_{G7} = n_G/n'_G \cdot \sin\theta_{G6} \tag{17}$$

$$\theta_{G8} = \theta_{G7} + \alpha \tag{18}$$

$$\sin\theta_{G9} = n_G \cdot \sin\theta_{G8} \tag{19}$$

The green light has an output angle of $\theta_{G9}$ relative to a normal line of the first surface 71 of the light path synthesizing element.

When the first and second wedge-shaped prisms 68 and 69 have angles of α and β respectively such that $\theta_{B1}$, $\theta_{G4}$ and $\theta_{G9}$ are almost same, the light emitted from the light path synthesizing element have an equivalent angle to form the best configuration.

For example, when the first and second wedge-shaped prisms 68 and 69 have a refractive index of 1.5 and $\theta_{B1}$ is 45°, α and β are 0.82° and 0.84°, respectively.

Figure 15:
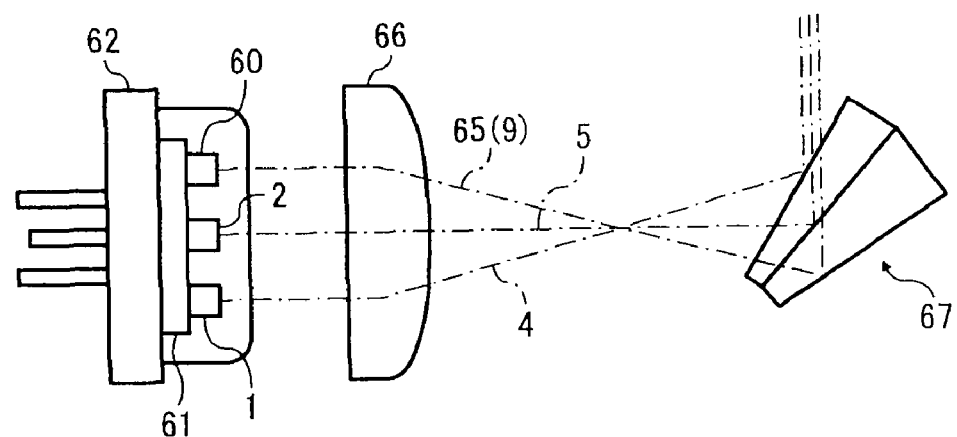
FIG. 15 is a schematic plane view illustrating a third embodiment of the lighting device of the present invention.

In FIGS. 15 to 17, light from the first, second and third light sources have light axes in a same plane, but which the lighting device of the present invention not limited to. The light axes may not be in a same plane, and normal lines of the first, second and third surfaces may not be in a same plane.

Figure 18:
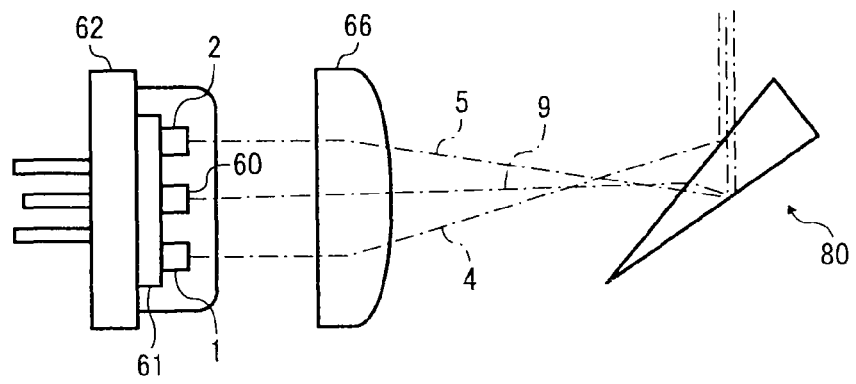
FIG. 18 is a schematic plane view illustrating a fourth embodiment of the lighting device of the present invention.

FIG. 18 is a fourth embodiment. This is almost equal to that of FIG. 15, and a birefringent light path synthesizing element 80 is located instead of the light path synthesizing element 67. The birefringent light path synthesizing element 80 is formed of a birefringent element having different refractive indices according to polarization directions of incident light. In addition, the red LD2 and the green light source 60 are formed such that the output light have mutually-perpendicular polarization directions. Having different refractive indices according to polarization directions of incident light, the birefringent element can reduce a mutual light axes angle error of the red light 5 and the green light 9 when the polarization directions thereof are different from each other.

Figure 19:
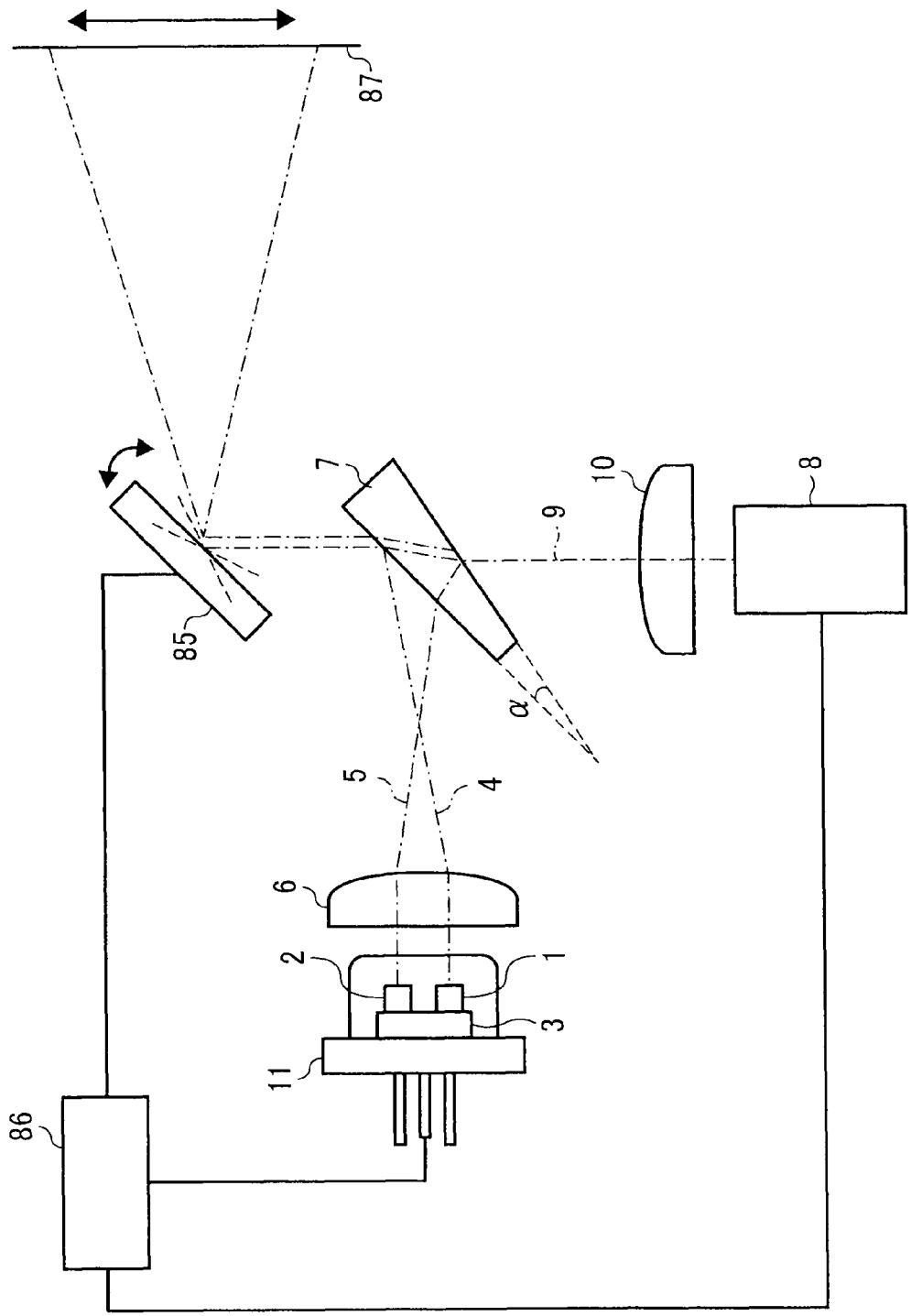
FIG. 19 is a schematic view illustrating a projection display unit in a fifth embodiment of the lighting device of the present invention.
Figure 20:
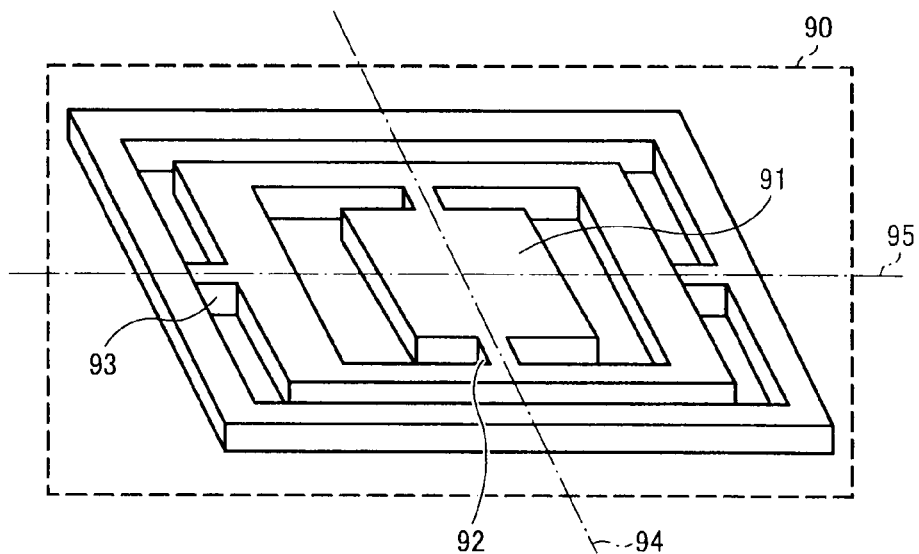
FIG. 20 is a perspective view illustrating the configuration of a MEMS mirror as a scanning means.

FIGS. 19 and 20 show a fifth embodiment (projection display unit).

A scanning projector can be configured with the light devices shown in FIGS. 1, 7, 15 and 18. As an example, an embodiment of a scanning projector using the lighting device shown in FIG. 1 will be explained. A scanning projector in FIG. 19 includes a scanner 85 two-dimensionally scanning the light emitted from the lighting device and a controller 86 controlling the scanner 85 and the light source of the lighting device in addition to the light device in FIG. 1.

The controller 86 adds a modulation to the light source so as to add a desired image in synchronization with the movement of the scanner 85. The scanner 85 can shake a reflection surface in a direction indicated by an arrow, and further in a direction of the paper depth.

This forms a two-dimensional projection image on a screen 87. Galvanometer mirrors, polygon mirrors and MEMS mirrors prepared by semiconductor process technologies, etc. can be used as the scanner. Particularly, the MEMS mirrors being very compact and consuming low power is most suitably used for a small projector.

One biaxially-movable mirror is shown in FIG. 19, but two monoaxially-movable mirrors may be used.

The configuration of a MEMS mirror usable as a scanner is shown in FIG. 20. A MEMS mirror 90 has a structure where a microscopic mirror 91 having a reflection surface is supported by a torsion bars 92 and 93. The microscopic mirror 91 is resonantly reciprocated almost on an axis 94 by the torsion of the torsion bar 92. In addition, it is resonantly reciprocated almost on an axis 95 by the torsion of the torsion bar 93. The reciprocations almost on the axes 94 and 95 two-dimensionally vary a normal line direction of the deflected surface of the microscopic mirror 91.

Therefore, a beam entering the microscopic mirror 91 changes in its reflection direction to two-dimensionally scan with the beam.

Such a projector modulates the light source intensity in synchronization with movement of the scanner, and a light source endurable to high-speed modulation is needed to display an image natural to the human eye.

Figure 21:
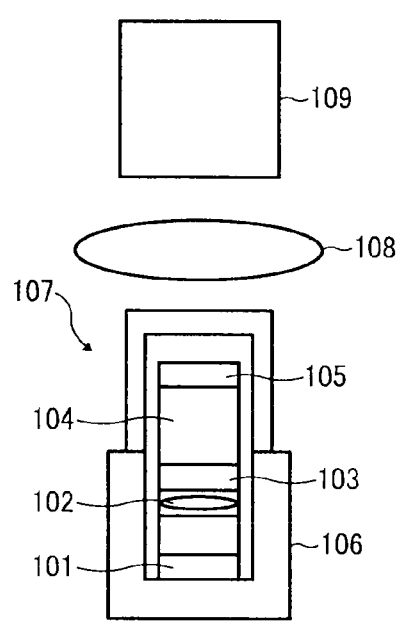
FIG. 21 is a schematic view illustrating a configuration example of a green light source modulable at high-speed.

An embodiment of a green light source modulatable at high speed is shown in FIG. 21. A LD-excited solid laser is used as a green light source. Light having a wavelength of 808 nm from a LD for exciting is collected by a collecting lens 102 to a Nd:YA crystal 103 to be excited. The Nd:YA crystal 103 emits light having a wavelength of 1064 nm, and which is converted to have a double wavelength of 532 nm in a green wavelength region by a nonlinear optical crystal 104.

A filter 105 blocking light which is not converted to have double wavelength and light of the LD for exciting is located at the light emitting part. These optical elements are contained in one package 106 to increase stability thereof and form a LD-excited solid laser 107.

Further, an output from the solid laser is introduced by a lens 108 to an acoustooptic element 109. The acoustooptic element 109 is capable of modulating an incident laser beam to have a high speed according to an input signal. The LD-excited solid laser is not ordinarily capable of modulating light to have a high speed. However, with another modulation element such as the acoustooptic element, the D-excited solid laser can be used as a light source for the projector of the present invention.

An electrical optical element can be used as the modulation element as well.

Figure 22:
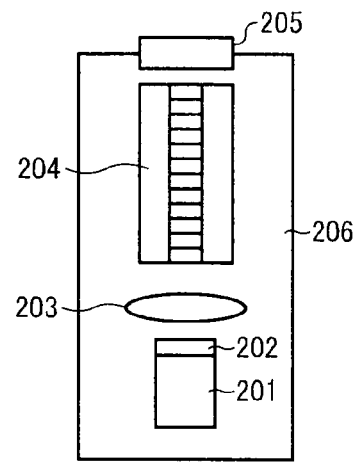
FIG. 22 is a schematic view illustrating another configuration example of a green light source modulable at high-speed.

Another embodiment of a green light source is shown in FIG. 22. The green light source in FIG. 22 includes a laser diode 201 emitting light having a wavelength of 1060 nm, a wavelength stabilizing element 202 stabilizing the output wavelength of the laser diode, a collecting lens 203, and a nonlinear optical crystal 204 converting the light having a wavelength of 1060 nm to light having a double wavelength.

A volume hologram can be used as the wavelength stabilizing element 202. Cyclic-polarization-reversed lithium niobate is preferably used as the nonlinear optical crystal 204 to increase the conversion efficiency to the light having a double wavelength. A filter 205 blocking the light having a wavelength of 1060 nm and all the elements are contained in one package 206.

The configuration having less parts is preferably used because of being capable of directly modulating the laser diode 101 to have a high speed to modulate the output light having a green wavelength. This laser configuration is disclosed on pages 85 to 89 in Nikkei Micro Device of November, 2007 in detail. (High Efficiency Green Laser Realizes One Hour Operation of Ultracompact Projector: A green laser which can be expected to have increased electrical efficiency by not less than 10% has been developed by Corning Inc. from US. The green laser has a volume less than 1 $cm^3$ aiming at a light source of "an ultracompact color projector" for mobile phones. At present, a laser diode directly oscillating green is difficult to realize, and devices converting the wavelength from laser diodes emitting near infrared light to obtain green light are being developed. Corning Inc. expects the efficiency of 15% equivalent to existing many blue laser diodes by this wavelength conversion method. The ultracompact projector can be operated for 1 hr or more with a battery included in a mobile phone.)

Figure 23:
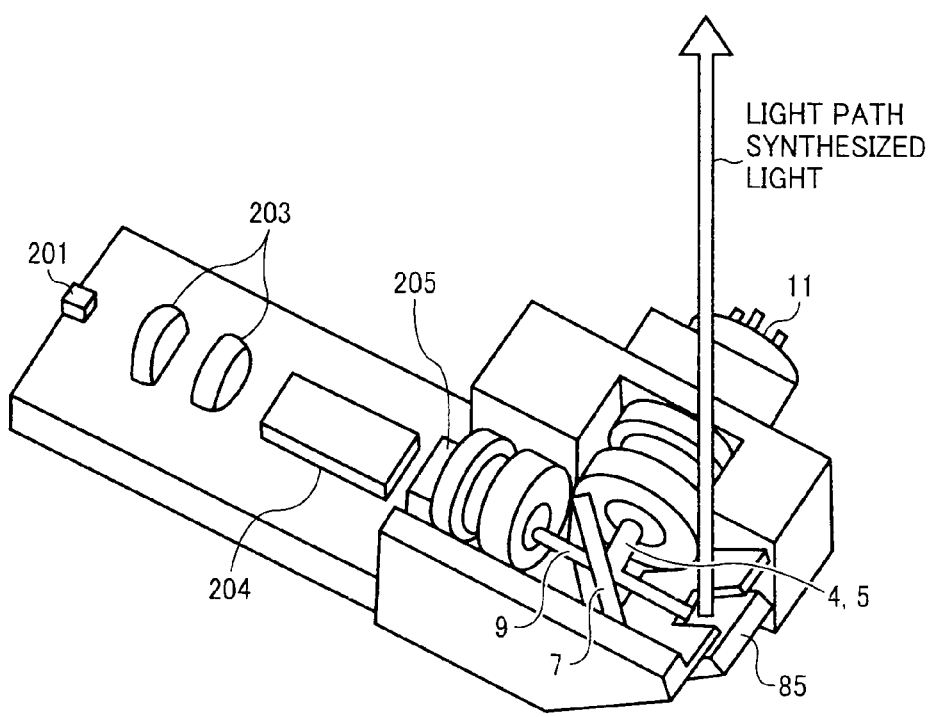
FIG. 23 is a perspective view illustrating a projector including the lighting device of the present invention.
Figure 24:
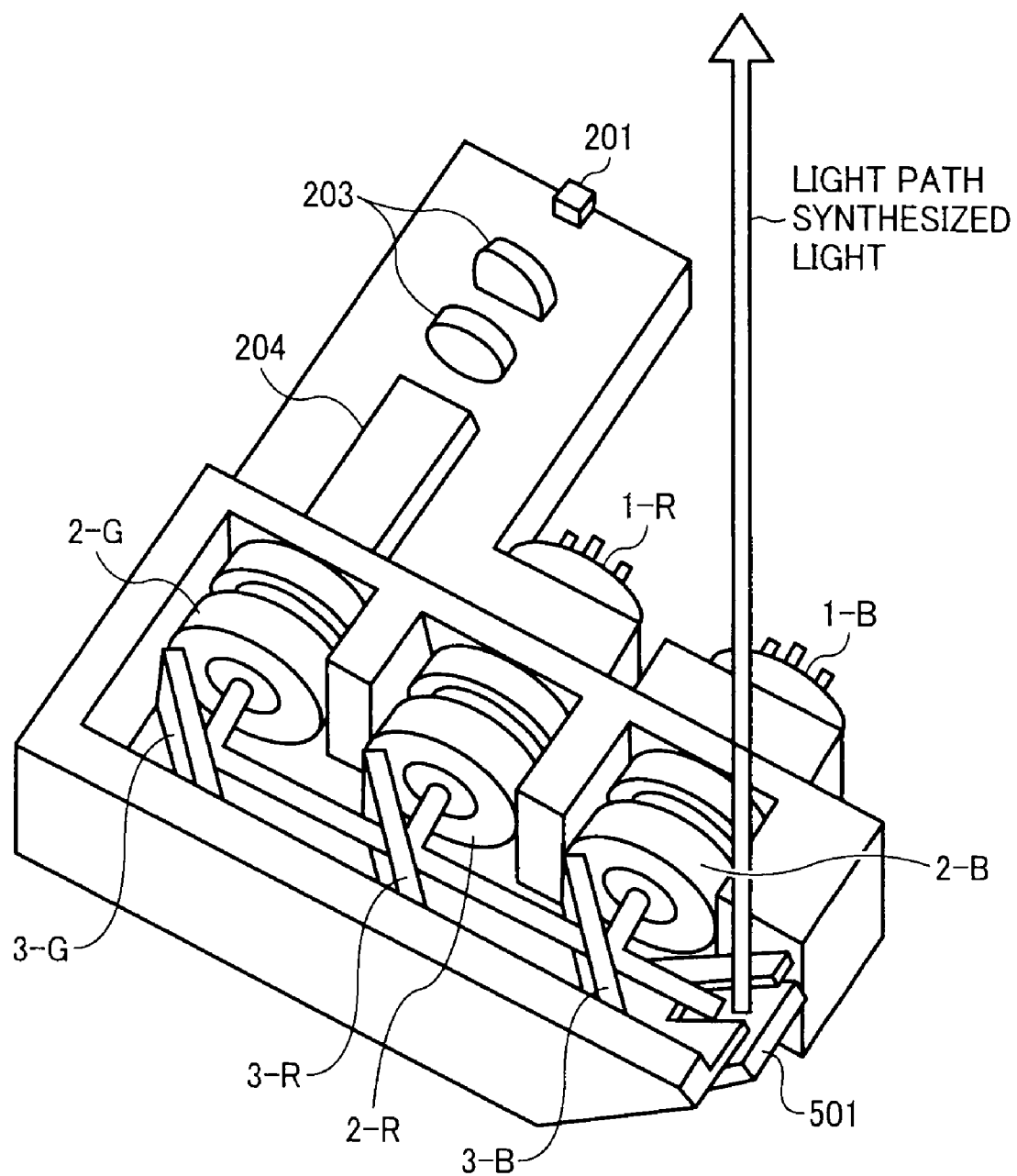
FIG. 24 is a perspective view illustrating a projector including a conventional lighting device.

The size comparisons between the projector of the present invention and the conventional laser scanning projector in FIG. 26 are shown in FIGS. 23 and 24. FIG. 23 shows a layout of the projector in FIG. 19, and FIG. 24 shows a layout of the projector in FIG. 26.

In FIG. 23, the nonlinear optical crystal 204 explained in FIG. 22 has a waveguide.

The projector of the present invention includes a blue light source and a red light source on a same mount, where a green light source emits light almost perpendicular to the blue and red light emitted from the blue and red light sources, and synthesizes a light path using two surfaces of one light path synthesizing element 7. The projector is more apparently compact (has smaller capacity) than a conventional method of locating one dichroic mirror for each light source. The optical system in FIG. 23 has a capacity about 5 cc, and that in FIG. 24 about 7 cc. Obviously, the projector of the present invention is more compact and has less parts than conventional ones, and is smaller by about 30%.

In FIG. 19, an optical system is not present between the scanner and a screen, and may be a projector having a projection optical system (sixth embodiment). The projection optical system can reduce image distortion on the screen.

Figure 25:
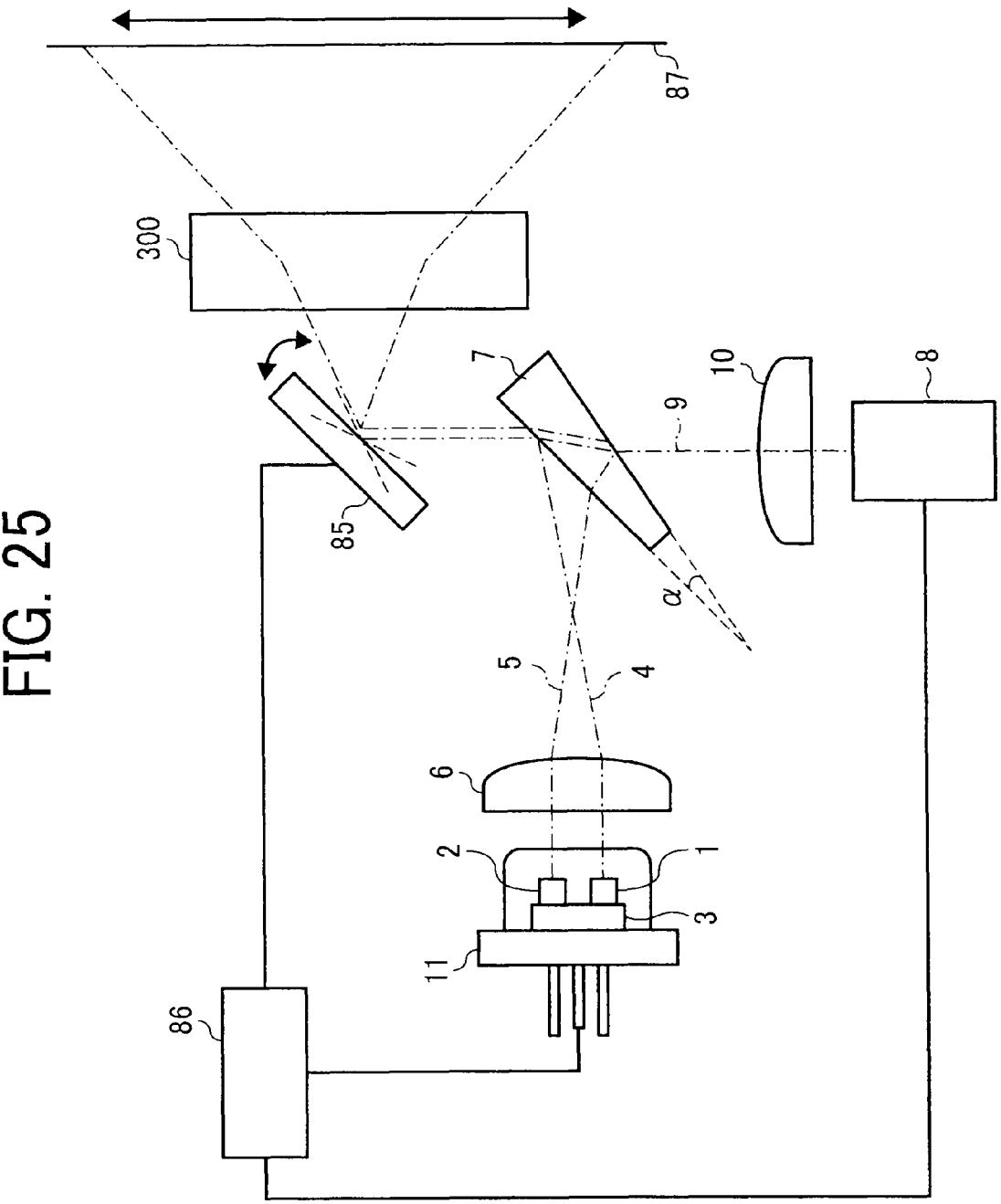
FIG. 25 is a schematic view illustrating a projection display unit in a sixth embodiment of the lighting device of the present invention.

An embodiment is shown in FIG. 25. In addition to the projector shown in FIG. 19, a projection optical system 300 reducing image distortion is installed.

The image distortion can be improved by adjusting time of emitting light, but image area becomes small or images become dark, and which can be prevented by an optical control.

A scanner such as MEMS mirrors has a limited scanning angle because of being difficult to have a large deflection angle, but the scanning angle can be enlarged with a projection optical system as shown in FIG. 25.

This application claims priority and contains subject matter related to Japanese Patent Application No. 2008-204661, filed on Aug. 7, 2008, the entire contents of which are hereby incorporated by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A lighting device, comprising:
    a first light source configured to emit light having a first wavelength;
    a second light source located close to the first light source and configured to emit light having a second wavelength in almost a same direction as that of the first light source;
    a third light source configured to emit light having a third wavelength and located so as to emit the light in a direction different from that of the first and second light sources;
    a first coupling optical system configured to couple light from the first and second light sources;
    a second coupling optical system configured to couple light from the third light source; and
    a light path synthesizing element configured to synthesize a light path of light from the first, second and third light sources,
    wherein the light path synthesizing element comprises a first surface and a second surface unparallel with the first surface, and wherein the first surface reflects light from the first light source and transmits light from the second and third light sources, and the second surface reflects light from the second light source and transmits light from the third light source.

2. The lighting device of claim 1, wherein the third light source emits light in a direction almost perpendicular to directions of light emitted from the first and second light sources.

3. The lighting device of claim 1, wherein the third light source emits green light, and the first light source emits red light and the second light source emits blue light or the first light source emits blue light and the second light source emits red light.

4. The lighting device of claim 1, wherein the first and second light sources are located on a same mount.

5. The lighting device of claim 1, wherein the light path synthesizing element is formed of a wedge-shaped flat plate, and wherein one side of the wedge-shaped flat plate is the first surface and the other side thereof is the second surface.

6. The lighting device of claim 5, wherein the wedge-shaped flat plate is located so as to have a peak toward the light sources.

7. The lighting device of claim 5, wherein the second light source is located so as to have a luminous point apart from a central light axis of the first coupling optical system by a distance of d1 in a direction reducing astigmatism caused by transmission of the light emitted from the second light source.

8. The lighting device of claim 5, wherein the third light source is located so as to have a luminous point apart from a central light axis of the second coupling optical system by a distance of d2 in a direction reducing astigmatism caused by transmission of the light emitted from the third light source.

9. The lighting device of claim 5, wherein the second light source emits light having an elliptically-distributed intensity and the wedge-shaped flat plate is located so as to bring the elliptically-distributed intensity close to a circularly-distributed intensity.

10. The lighting device of claim 1, wherein the light path synthesizing element is formed of laminated plural optical parts.

11. The lighting device of claim 10, wherein a surface of the light path synthesizing element light from the third light source enters and a surface thereof light from the third light source goes out are parallely formed.

12. The lighting device of claim 10, wherein the light path synthesizing element further comprises a first optical element comprising the first surface, a second optical element comprising the second surface and an angle adjuster configured to adjust a relative angle between the first surface and the second surface.

13. The lighting device of claim 10, wherein the light path synthesizing element is formed of plural materials having different refractive index wavelength dispersion from each other.

14. A projection image display unit, comprising:
    the lighting device according to claim 1;
    a scanner configured to two-dimensionally scan light emitted from the light device; and
    a controller configured to control outputs of the first, second and third light sources in synchronization with movement of the scanner.

15. A lighting device, comprising:
    a first light source configured to emit light having a first wavelength;
    a second light source located on a same mount of the first light source and configured to emit light having a second wavelength;
    a third light source located on the same mount of the first and second light sources and configured to emit light having a third wavelength and located so as to emit the light in a direction different from that of the first and second light sources;
    a coupling optical system configured to couple light from the first, second and third light sources; and
    a light path synthesizing element configured to synthesize a light path of light from the first, second and third light sources,
    wherein the light path synthesizing element comprises a first surface configured to reflect light from the first light source and transmits light from the second and third light sources, a second surface configured to reflect light from the second light source and transmits light from the third light source and a third surface configured to reflect light from the third light source.

16. A lighting device, comprising:
    a first light source configured to emit light having a first wavelength;
    a second light source located on a same mount of the first light source and configured to emit light having a second wavelength;
    a third light source located on the same mount of the first and second light sources and configured to emit light having a third wavelength and located so as to emit the light in a direction different from that of the first and second light sources;

a coupling optical system configured to couple light from the first, second and third light sources; and a light path synthesizing element configured to synthesize a light path of light from the first, second and third light sources, wherein the second and third light sources emit light having different polarization directions, and the light path synthesizing element is at least partly formed of a birefringent material and comprises a first surface and a second surface having a different angle each other, and wherein the first surface is configured to reflect light from the first light source and transmits light from the second and third light sources and the second surface is configured to reflect light from the second and third light sources.

* * * * *